United States Patent
Singh

(10) Patent No.: US 9,720,861 B2
(45) Date of Patent: Aug. 1, 2017

(54) MEMORY ACCESS BY DUAL PROCESSOR SYSTEMS

(71) Applicant: QUALCOMM Technologies International, Ltd., Cambridge (GB)

(72) Inventor: Abhijeet Singh, Gilbert, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 14/558,147

(22) Filed: Dec. 2, 2014

(65) Prior Publication Data

US 2016/0154751 A1  Jun. 2, 2016

(51) Int. Cl.
- *G06F 13/00* (2006.01)
- *G06F 13/24* (2006.01)
- *G06F 9/52* (2006.01)
- *G06F 11/30* (2006.01)

(52) U.S. Cl.
CPC .............. *G06F 13/24* (2013.01); *G06F 9/52* (2013.01); *G06F 9/526* (2013.01); *G06F 11/3024* (2013.01); *G06F 11/3055* (2013.01)

(58) Field of Classification Search
None
See application file for complete search history.

(56) References Cited

U.S. PATENT DOCUMENTS

| | | | |
|---|---|---|---|
| 5,845,130 A | 12/1998 | Goff et al. | |
| 5,875,342 A | 2/1999 | Temple | |
| 6,161,162 A * | 12/2000 | DeRoo | G06F 9/30101 710/244 |
| 7,130,951 B1 | 10/2006 | Christie et al. | |
| 7,685,354 B1 * | 3/2010 | Hetherington | G06F 12/084 711/163 |
| 7,873,776 B2 * | 1/2011 | Hetherington | G06F 9/3802 711/5 |
| 8,438,237 B2 | 5/2013 | Lowe et al. | |
| 2008/0256348 A1 | 10/2008 | Prasad et al. | |
| 2009/0228895 A1 * | 9/2009 | Ding | G06F 9/4812 718/107 |
| 2011/0179311 A1 * | 7/2011 | Nachimuthu | G06F 11/3676 714/42 |
| 2012/0059489 A1 | 3/2012 | Martchovsky | |
| 2012/0166685 A1 | 6/2012 | Booth et al. | |
| 2013/0139156 A1 | 5/2013 | Tsirkin | |

(Continued)

FOREIGN PATENT DOCUMENTS

| | | |
|---|---|---|
| EP | 0132157 A2 | 1/1985 |
| EP | 0871307 A2 | 10/1998 |
| WO | 2004003759 A1 | 1/2004 |

(Continued)

OTHER PUBLICATIONS

GB1509869.2. Search Report. Mail Date May 25, 2016.

(Continued)

*Primary Examiner* — Michael Sun
(74) *Attorney, Agent, or Firm* — Procopio, Cory, Hargreaves & Savitch LLP

(57) ABSTRACT

Methods and apparatus for control access to memory in dual-processor. In particular, there are disclosed methods and apparatus for use where a single memory is shared for instructions for the processors and a data store to reduce conflicts between access requirements.

20 Claims, 2 Drawing Sheets

(56) References Cited

U.S. PATENT DOCUMENTS

2015/0006962 A1* 1/2015 Swanson ............. G06F 11/0778
　　　　　　　　　　　　　　　　　　　　　714/38.11

FOREIGN PATENT DOCUMENTS

| WO | 2009115777 | | 9/2009 |
|---|---|---|---|
| WO | 2010042131 | A1 | 4/2010 |

OTHER PUBLICATIONS

International Search Report and Written Opinion—PCT/US2015/061942—ISA/EPO—Mar. 8, 2016.
PCT/IPEA/408. Written Opinion of the International Preliminary Examining Authority. PCT/US2015/061942. Mail date Nov. 15, 2016. 14 pages.

* cited by examiner

MEMORY ACCESS BY DUAL PROCESSOR SYSTEMS

FIELD OF THE INVENTION

The present invention relates generally to computer systems, and more particularly to methods and apparatuses for memory access by dual processor systems.

BACKGROUND

Processor systems may utilise a common memory store (for example flash memory) for instructions and data. There may therefore be a need to control access to that memory to avoid conflicts between instruction read and data read and write processes.

In single-processor systems managing interactions is relatively straightforward as processor interrupts can be paused while data is written or erased. However, this is significantly more complex for dual-processor systems in which both processors are fetching their instructions from the same memory.

Global Navigation Satellite System (GNSS) is a standard generic term for navigation systems utilising signals from satellites to calculate position. Maintaining a lock on the satellite signals is very challenging, particularly in harsh urban environments. Blocking processor access to allow data storage exacerbates such challenges and losing lock, large position errors, or loss of synchronisation can easily occur without careful system design.

There is therefore a need for a means to manage memory access of dual-processor systems, particularly for GNSS devices, and a means to recover processor operation after memory access.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method for controlling access to memory by a system comprising first and second processors, the method comprising the steps of generating or receiving data at the second processor for storage, disabling operation of the first processor by the second processor, disabling interrupts of the second processor, storing the data to the memory by the second processor, enabling interrupts of the second processor, and enabling the first processor.

The method may further comprise the step of ascertaining the period for which the first processor was disabled. The processor may be reset if the period is greater than a threshold.

The method may further comprise the step of monitoring the state of the first processor using the second processor.

The method may further comprise the step of performing a reset of the first processor if the state of that first processor does not change for greater than a threshold time.

The system may be a GNSS receiver, and the first processor is performing tracking operations.

The threshold may be 50 ms.

The threshold time may be 2 seconds.

The first and second processors may be in a single integrated circuit package.

The method may further comprise the step of determining the stability of the first processor prior to disabling that processor, and only disabling the processor if it is stable. Determining the stability of the first processor comprises comparing the number of consecutive position calculations to a threshold, wherein the first processor is determined to be stable if the number of consecutive calculations exceeds the threshold. Determining the stability of the first processor comprises comparing the time since the processor was last disabled to a threshold, wherein the first processor is determined to be stable if the time is greater than the threshold. Determining the stability of the first processor comprises verifying that there is sufficient time prior to the next scheduled event to complete storing the data.

The method may further comprise the step of assigning a priority to data to be stored, and storing data in an order defined at least in part by that priority.

There is also disclosed a dual-processor device comprising first and second processors, and a port for communication with a memory, wherein the device is configured to perform the method described herein.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
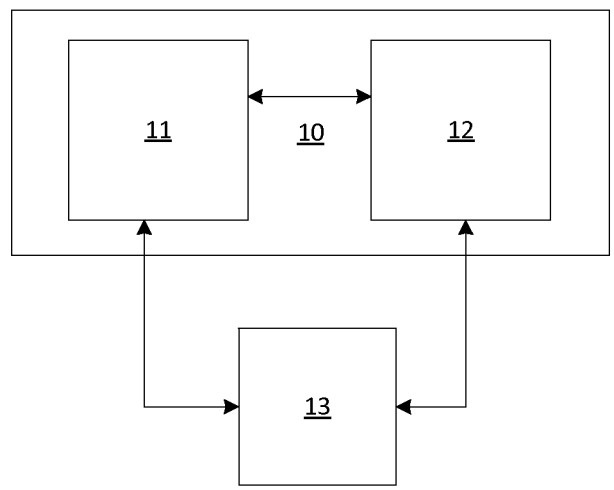
FIG. 1 shows an outline schematic diagram of a dual-processor system.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a simplified schematic diagram of a dual-processor GNSS receiver 10. The receiver comprises first 11 and second 12 processors, and is in communication with flash memory 13 via an appropriate port. The flash memory may be serial or parallel memory. Each processor conducts aspects of signal processing, position calculation, and other supporting tasks. The first and second processors are connected to exchange data and to allow interaction of the two processors. In an example system the first processor is a DSP processor performing tracking and signal processing tasks, and the second processor is a general-purpose processor, such as a RISC processor, performing general control tasks. The first and second processor are typically integrated in a single integrated circuit package.

GNSS receivers need to store data such as Extended Ephemeris, Almanac, RTC, Crystal Learning tables, and UTC data at the same time as processing received signals. In the receiver of FIG. 1 this data is stored to the same external flash memory from which both the processors are fetching their instructions.

Methods to control asynchronous fetching of instructions by each processor are known but co-ordination of instruction fetches with data storage operations without degrading GNSS receiver performance, or overrunning scheduled tasks, present difficulties.

As explained in more detail below with specific reference to FIG. 2, flash memory writes are controlled by one of the two processors. If data for storage is generated at the non-controlling processor it is transferred to the controlling processor for storage. The non-controlling processor is disabled and the controlling processor writes the data to the flash memory using a process which cannot be interrupted. Once the write has completed the non-controlling processor is re-enabled by the controlling processor and processing continues. Disabling the non-controlling processor pauses the processor such that it resumes operation at the same point.

Where specific action may be required if the first processor's interrupts are disabled for longer than a certain period the second processor monitors the time for which the interrupts of the first processor were disabled, and if greater than a threshold appropriate actions may be triggered to re-initialise the first processor. For example, in GNSS receivers tracking performance may be lost after a certain period.

Figure 2:
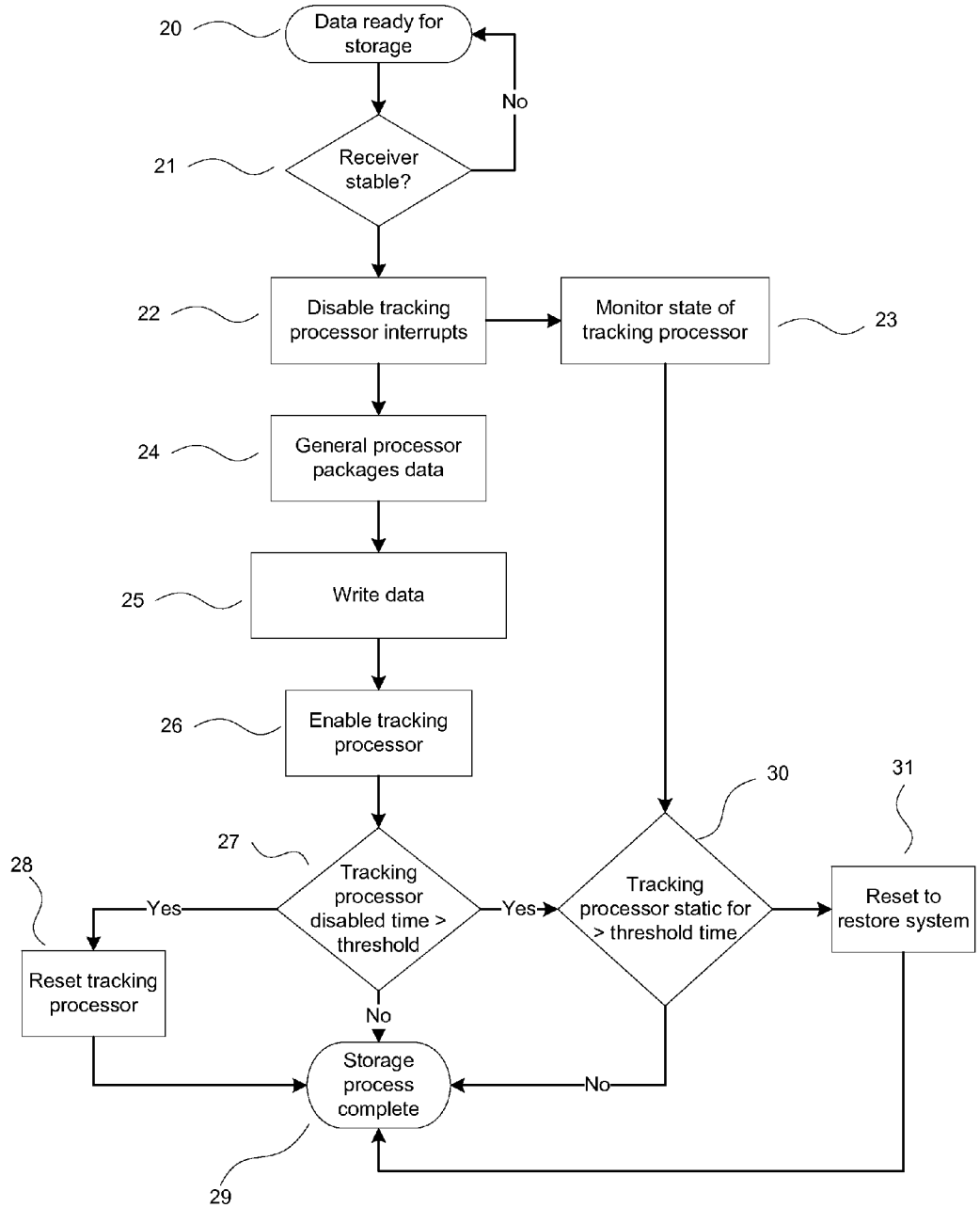
FIG. 2 shows a flow-chart of a method of controlling access to memory.

FIG. 2 shows a flow-chart of a specific method to control access to memory in a dual-processor GNSS device. The device comprises a tracking processor, which is typically a DSP processor and is utilised to processed received signals, and a general processor which provides position calculation and general control processes.

During operation of the device data is generated by the tracking processor and the general processor which must be stored to flash memory. Data generated by the tracking processor is first transferred to the general processor. Once the data is ready for storage (step 20) it is verified at step 21 whether the receiver is stable. The receiver may be determined to be stable by counting consecutive valid position outputs. In an example, the receiver is determined to be stable after ten valid consecutive outputs. As set out in more detail below, further checks may also be made to ensure the data can be stored without excessive disruption.

At step 22 the tracking processor is disabled. Disabling the tracking processor may comprise issuing a pause command, turning the processor off, disabling all interrupts, or preventing any reads from the flash memory. The purpose of disabling the processor is to prevent access to the flash memory by the tracking processor, thus avoiding memory conflicts. At step 23 a state machine is started on the general processor to monitor the status of the tracking processor. This state machine is used to ensure the tracking processor is re-enabled correctly.

At step 24 the data is packaged by the general processor such that it can be stored to the flash memory in a single operation and at step 25 the general processor writes the data to the flash memory. This is done using a critical section of code to ensure the process is not interrupted. Other techniques can also be utilised to ensure the process completes without interruption, for example by disabling all interrupts in the general processor before commencing the write operation, and then re-enabling them after completion.

Once the write process is completed (and the general processor's interrupts are re-enabled if necessary) the general processor then enables the tracking processor at step 26.

The general processor monitors (step 27) the time for which the tracking processor's interrupts were disabled and takes appropriate steps to ensure tracking operation is resumed correctly. The threshold applied at step 27 is determined according to the specific characteristics of the time required to write data and the ability of the receiver to handle periods of being disabled. Both of these values can vary very significantly and specific values may be selected for each configuration. In an example, the tracking processor may be reset if it was disabled for more than 50 ms for Parallel Flash and 400 ms for SQIF. After the reset satellite signals being tracked can re-synchronise with the general processor. Timings of this magnitude are most likely to be encountered when it is necessary to erase sectors of the flash memory during the write process. The process then completes at step 29.

If the tracking processor was disabled for less than the threshold then the process completes at step 29 without any further steps being required.

As noted above, when the tracking processor is disabled a state machine is started (step 23) in the general processor to monitor the state of the tracking processor. It is possible that the wake-up signal from the general processor to the tracking processor (step 26) is missed by the tracking processor and the tracking processor does not resume full operation. The state machine monitors the state of the tracking processor (step 30) and if that state machine has not moved for more than a threshold time then a reset is performed of the tracking processor at step 31 to resume operation. This threshold may be set to, for example, 2 seconds.

The state machine may be de-activated once all data storage operations have been completed, and the tracking processor is in an operational state.

As explained above, the data storage operation may be initiated once it is detected that the receiver system is stable. It may also be important to ensure the data storage operation is run at an appropriate time to ensure time-sensitive features (for example generation of the 1PPS signal in a GNSS receiver) are not affected. Stability is determined in the above example by ensuring at least 10 consecutive positions have been calculated, but other means may also be used in addition or instead. For example, it may also be a requirement that all measurements from the tracking processor have been received and processed by the general processor. The general processor may also verify that there is sufficient time to allow the data storage operation before the next scheduled task. Furthermore, the stability check could utilise the time since completion of the last flash write or erase process. That is, the time the tracking processor has been enabled for since it was last disabled.

Data for storage may be tagged with an indication of priority so that data stores can be scheduled appropriately to store the most important data first. All different data types for storage are prioritised. Additionally data for storage can be received from a host processor via a communication port. This type of data received from a host processor is assigned the highest priority for storage as soon as possible. An example of externally generated data is Server Generated Extended Ephemeris (SGEE) data.

For high-priority data storage may be a higher priority than maintaining receiver stability. In these circumstances the receiver stability check may not be performed and the storage method proceeds directly to disabling the tracking processor prior to storing the data. A balance is thus defined between ensuring stability and delaying storage of data. The use of multiple priority levels allows this balance to be managed in an efficient and flexible manner. Priority may be assigned by the general processor, or by the originator of the data (for example the tracking processor may tag data with a priority).

Some flash memory functions may not be appropriate for a dual-processor system operating as described herein. For example, utilising erase suspend mode of a flash memory can lead to a significant increase in the time required for the operation and lead to greater disruption of the tracking processor while the general processor conducts memory operations. Instead, data write and erase operations are managed as described above such that the tracking processor is disabled according to a calculated schedule and can resume operation as quickly as possible.

The above description has been given with reference to a dual-processor GNSS receiver. However, as will be appreciated the principles and methods discussed herein are equally applicable to dual-processor systems in other applications.

In the above description reference has been normally made to writing data to flash memory, but as will be appreciated the same method apply to other memory operations such as erasures.

The description has been given with respect to flash memory, but the methods and techniques may be applied to any memory technology.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method for controlling access to memory by a system comprising first and second processors, the method comprising the steps of
generating or receiving data at the second processor for storage,
determining a stability of the first processor and disabling an operation of the first processor by the second processor if the first processor is determined to be stable, disabling interrupts of the second processor,
storing the data to the memory by the second processor, enabling interrupts of the second processor, and
enabling the first processor.

2. The method according to claim 1, further comprising the step of determining a period for which the operation of the first processor was disabled.

3. The method according to claim 2, further comprising the step of performing a reset of the first processor if the period is greater than a threshold.

4. The method according to claim 1, further comprising the step of monitoring a state of the first processor using the second processor.

5. The method according to claim 4, further comprising the step of performing a reset of the first processor if the state of the first processor does not change for greater than a threshold time.

6. The method according to claim 1, wherein the system is a global navigation satellite system (GNSS) receiver, and the first processor is performing tracking operations.

7. The method according to claim 3, wherein the threshold is 50 ms.

8. The method according to claim 5, wherein the threshold time is 2 seconds.

9. The method according to claim 1, wherein the first and second processors are in a single integrated circuit package.

10. The method according to claim 1, wherein determining the stability of the first processor comprises comparing a number of consecutive position calculations to a threshold, wherein the first processor is determined to be stable if the number of consecutive calculations exceeds the threshold.

11. The method according to claim 1, wherein determining the stability of the first processor comprises comparing a time since the first processor was last disabled to a threshold, wherein the first processor is determined to be stable if the time is greater than the threshold.

12. The method according to claim 1, wherein determining the stability of the first processor comprises verifying that there is sufficient time prior to a next scheduled event to complete storing the data.

13. The method according to claim 1, further comprising the step of assigning a priority to data to be stored, and storing data in an order defined at least in part by that priority.

14. A dual-processor device comprising first and second processors, and a port for communication with a memory, wherein the device is configured to perform the method of claim 1.

15. An apparatus to control access to memory, the apparatus comprising:
a first processor;
a second processor configured to generate or receive data for storage in the memory unit,
the second processor also configured to determine a stability of the first processor and if the first processor is determined to be stable, perform following actions:
disable an operation of the first processor;
disable interrupts of the second processor;
store the data to the memory;
enable interrupts of the second processor; and
enable the operation of the first processor.

16. The apparatus of claim 15, wherein the second processor is further configured to determine a period for which the operation of the first processor is disabled, if the first processor is determined to be stable.

17. The apparatus of claim 16, wherein the second processor is further configured to perform a reset of the first processor if the period is greater than a threshold.

18. A system to control access to memory, the system comprising:
- a global navigation satellite system (GNSS) receiver comprising:
- a first processor configured perform tracking operations;
- a second processor configured to generate or receive data for storage in the memory unit,
- the second processor also configured to determine a stability of the first processor and if the first processor is determined to be stable, perform following actions:
- disable an operation of the first processor;
- disable interrupts of the second processor;
- store the data to the memory;
- enable interrupts of the second processor; and
- enable the operation of the first processor.

19. The system of claim 18, wherein the second processor is further configured to determine a period for which the operation of the first processor is disabled, if the first processor is determined to be stable.

20. The system of claim 19, wherein the second processor is further configured to perform a reset of the first processor if the period is greater than a threshold.

* * * * *